United States Patent
Bonadies et al.

(10) Patent No.: US 6,925,861 B2
(45) Date of Patent: Aug. 9, 2005

(54) FUEL DRIVEABILITY INDEX DETECTION

(75) Inventors: Joseph V. Bonadies, Clarkston, MI (US); James C. Matasic, Mentor, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/971,818

(22) Filed: Oct. 22, 2004

(65) Prior Publication Data

US 2005/0085991 A1 Apr. 21, 2005

Related U.S. Application Data

(63) Continuation of application No. 09/998,838, filed on Nov. 15, 2001.

(51) Int. Cl.$^7$ ............................ G01L 3/26; G01M 15/00
(52) U.S. Cl. ........................................................ 73/113
(58) Field of Search ........................... 73/113; 123/491, 123/674

(56) References Cited

U.S. PATENT DOCUMENTS

| | | |
|---|---|---|
| 4,375,797 A | 3/1983 | Otsuka et al. |
| 5,875,759 A | 3/1999 | Meyer et al. |
| 5,893,349 A | 4/1999 | Rado |
| 5,957,994 A | 9/1999 | Meyer et al. |
| 6,079,258 A | 6/2000 | List et al. |
| 6,079,396 A | 6/2000 | Ament et al. |
| 6,140,647 A | 10/2000 | Welch et al. |
| 6,360,726 B1 | 3/2002 | Javaherian |
| 6,499,476 B1 | 12/2002 | Reddy |
| 6,564,624 B2 | 5/2003 | Lin et al. |
| 6,588,253 B2 | 7/2003 | Lambert et al. |
| 6,588,409 B2 | 7/2003 | Maloney et al. |
| 6,598,589 B2 | 7/2003 | Frelund et al. |
| 6,637,413 B2 | 10/2003 | Maloney et al. |
| 6,655,358 B2 | 12/2003 | Maloney et al. |

*Primary Examiner*—Eric S. McCall
*Assistant Examiner*—Octavia Davis
(74) *Attorney, Agent, or Firm*—Jimmy L. Funke

(57) ABSTRACT

An exemplary embodiment is a method, system and storage medium for fuel driveability index detection. The system includes an engine and an oxygen sensor disposed within the exhaust gas passage of the engine. An engine control module is operatively connected to the engine. The engine control module has a processor for obtaining a first input signal indicating a first oxygen sensor voltage, obtaining a second input signal indicating a second oxygen sensor voltage at a period subsequent to the first input signal, determining a first voltage trend based on the first input signal and the second input signal and determining whether the first voltage trend is decreasing at a rate greater than a first voltage threshold rate.

7 Claims, 3 Drawing Sheets

FUEL DRIVEABILITY INDEX DETECTION

CROSS REFERENCE TO RELATED APPLICATION

The present application is a continuation application of U.S. application Ser. No. 09/998,838 filed on Nov. 15, 2001.

BACKGROUND

As new emission laws require the reduction of tail pipe hydrocarbon emissions, engine cold start is a period when hydrocarbon emissions must be minimized. To reduce automotive vehicle emissions, substantial effort is being made to warm up catalytic treatment devices more quickly and to control engine air/fuel ratio close to stoichiometry following a vehicle cold start. High driveability index (low volatility fuel) causes the open loop air/fuel ratio during engine cold start to become lean and contribute to unstable combustion. In turn, the open loop air/fuel ratio is made richer, which consequently increases emissions when a lower driveability index fuel (higher volatility) is used. The driveability index is a value for measuring the expected performance during a vehicle cold start or drive-away. Better performance is expected from fuels with a lower driveability index value.

To meet certain emissions reduction goals, the exhaust stream from an engine to the catalytic treatment device must be substantially at stoichiometry or lean within seconds following a cold start. Providing a stoichiometric mixture of fuel and air within the combustion chamber of the engine requires good fuel injection control and tightly controlled fuel characteristics. Fuel injection control precision is improving. However, mid-range volatility of commercial fuel—a preferred fuel characteristic for exhaust stream air/fuel ratio control—can be highly variable depending on such factors as the geographical region, the season, and the feedstock. Accordingly, to ensure acceptable cold start driveability, the calibration used in engine air/fuel ratio control should be biased fuel rich of stoichiometry to anticipate a worst-case driveability index (volatility) fuel.

Automotive vehicles with an internal combustion engine have an exhaust system including a pathway for exhaust gas to move away from the engine. Depending on the desired operating state, internal combustion engines can be operated with air/fuel ratios in which (1) the fuel constituent is present in a stoichiometric surplus (rich range), (2) the oxygen of the air constituent is stoichiometrically predominant (lean range), and (3) the fuel and air constituents satisfy stoichiometric requirements. The composition of the air/fuel mixture determines the composition of the exhaust gas. In the rich range, considerable quantities of nonburned or partially burned fuel are found, while the oxygen has been substantially consumed and has nearly disappeared. In the lean range, the ratios are reversed, and in a stoichiometric composition of the air/fuel mixture, both fuel and oxygen are minimized.

It is well known that the oxygen concentration in the exhaust gas of an engine has a direct relationship to the air/fuel ratio of the fuel mixture supplied to the engine. As a result, gas sensors, namely oxygen sensors, are used in automotive internal combustion control systems to provide accurate oxygen concentration measurements of automobile exhaust gases for determination of optimum combustion conditions, maximization of fuel economy, and management of exhaust emissions.

A switch type oxygen sensor, generally, comprises an ionically conductive solid electrolyte material, a sensing electrode, which is exposed to the exhaust gas, and a reference electrode, which is exposed to the reference gas. It operates in potentiometric mode, where oxygen partial pressure differences between the exhaust gas and reference gas on opposing faces of the electrochemical cell develop an electromotive force, which can be described by the Nernst equation:

$$E = \left(\frac{RT}{4F}\right)\ln\left(\frac{P_{O_2}^{ref}}{P_{O_2}}\right)$$

where: E=electromotive force
R=universal gas constant
F=Faraday constant
T=absolute temperature of the gas
$P_{O_2}^{ref}$=oxygen partial pressure of the reference gas
$P_{O_2}$=oxygen partial pressure of the exhaust gas The large oxygen partial pressure difference between rich and lean exhaust gas conditions creates a step-like difference in cell output at the stoichiometric point; the switch-like behavior of the sensor enables engine combustion control about stoichiometry. Stoichiometric exhaust gas, which contains unburned hydrocarbons, carbon monoxide, and oxides of nitrogen, can be converted very efficiently to water, carbon dioxide, and nitrogen by automotive three-way catalysts in automotive catalytic converters. In addition to their value for emissions control, the sensors also provide improved fuel economy and drivability.

BRIEF SUMMARY

An exemplary embodiment is a method, system and storage medium for fuel driveability index detection. The system includes an engine and an oxygen sensor disposed within the exhaust gas passage of the engine. An engine control module is operatively connected to the engine. The engine control module has a processor for obtaining a first input signal indicating a first oxygen sensor voltage, obtaining a second input signal indicating a second oxygen sensor voltage at a period subsequent to the first input signal, determining a first voltage trend based on the first input signal and the second input signal and determining whether the first voltage trend is decreasing at a rate greater than a first voltage threshold rate.

BRIEF DESCRIPTION OF THE DRAWINGS

Referring now to the accompanying drawings, wherein like elements are numbered alike in the several figures in which.

DETAILED DESCRIPTION OF AN EXEMPLARY EMBODIMENT

By monitoring the voltage output trend with time of a fast light-off oxygen sensor (such as a planar, low mass or the like sensor with a light-off within five seconds), either with or without a pumped air reference, a qualitative determination of fuel driveability index (D.I.) may be made. By detecting the driveability index, engine stall at cold start and hydrocarbon emissions at cold start may be lowered. For example, fuels with a high driveability index fail to sufficiently volatilize at low temperatures (e.g., at cold start), thereby possibly causing an engine to stall. Consequently, at low temperatures, high driveability index fuels do not combust as readily as low driveability index fuels. Although fuels with a low driveability index volatilize at low temperatures more readily, such fuels may cause higher emissions if the system is calibrated for "worst-case" (e.g., high driveability index) fuels.

The driveability index determination is preferably made during the first five seconds of a vehicle cold start at standard temperature and pressure. For example, the oxygen sensor responds to the air/fuel ratio from the combustion chamber within a reasonably short period of time (e.g., during that period of time when a fueling change is able to affect the cold start emissions and driveability results). Thus, for a fueling change to significantly reduce cold start emissions, the change is preferably implemented within about five seconds. In addition, because the oxygen sensor responds to the air/fuel ratio from the combustion chamber, it may provide a more direct response to fuels with varying volatility.

Figure 1:
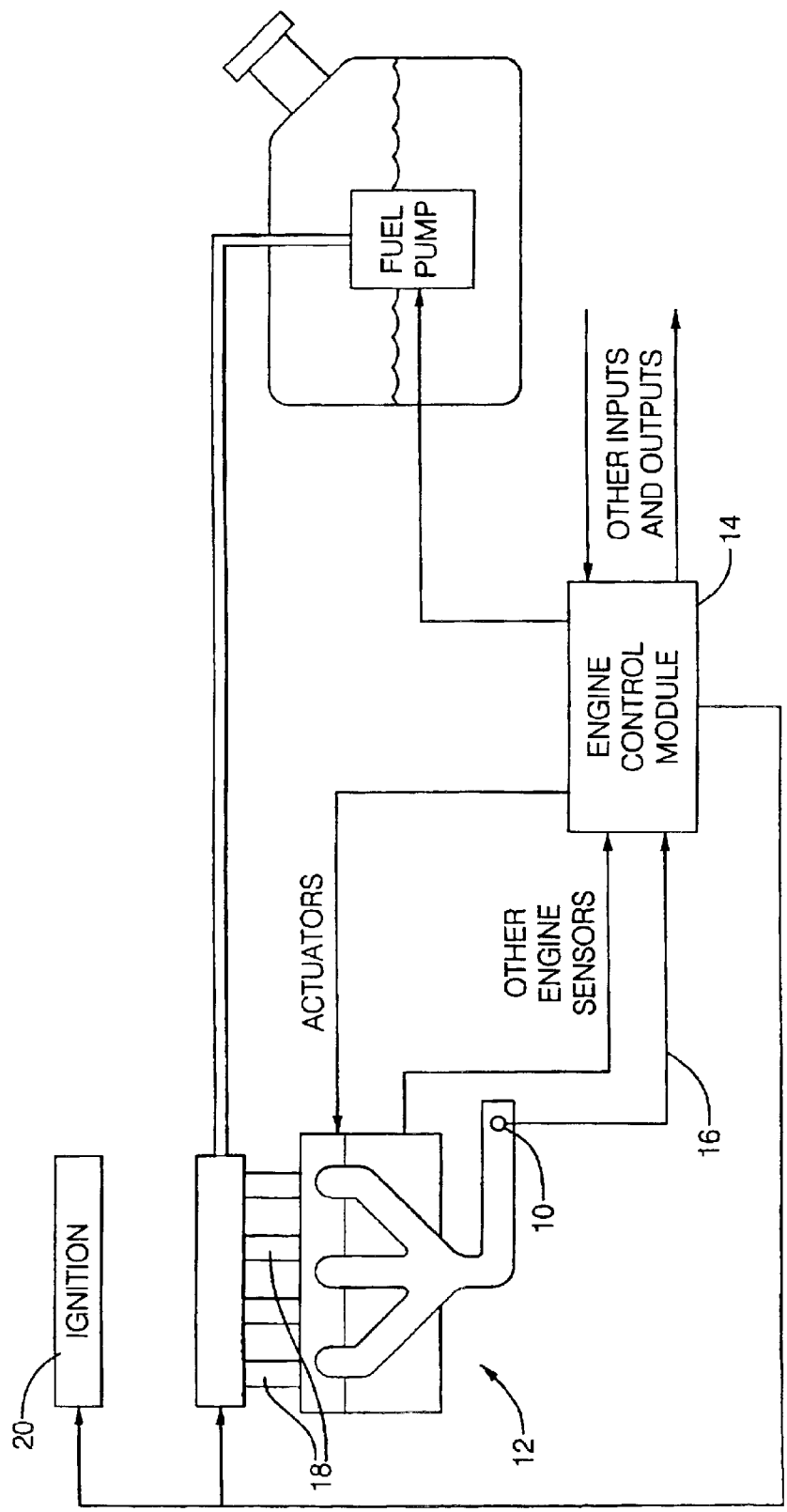
FIG. 1 is a block diagram of an exemplary system for fuel driveability index detection.

FIG. 1 is a block diagram of an exemplary system for fuel driveability index detection. The system includes an oxygen sensor 10 disposed within the exhaust gas passage of an internal combustion engine 12. The output of the oxygen sensor 10 is operatively coupled to an engine control module 14. Engine control module 14 may include a processor (not shown) including such well-known elements as a read only memory device (ROM) for long term storage and retrieval, random access memory device (RAM) for temporary, rapid data storage and retrieval, and input/output devices (I/O) for managing receipt of input signals (such as oxygen sensor voltage 16) and for transmitting output signals for providing control and diagnostics operations (such as for adjusting open and closed loop fueling with fuel injectors 18) as well as combinations comprising at least one of the foregoing elements.

Fuel may be injected into either an intake plenum or directly into the engine cylinders where some of the fuel is combusted with air (with the aid of a spark ignition system 20, or the like), and some of the fuel is left uncombusted on the cylinder walls. The combusted air/fuel mixture exits the cylinders via the exhaust system where the oxygen sensor 10 reacts to the exhaust gas by producing either a first voltage indicative of being rich of stoichiometry (e.g., approaching about one volt) or a second voltage indicative of being lean of stoichiometry (e.g., approaching zero volt). This oxygen sensor voltage is used by the engine control module 14 to determine when a change to the fueling should occur, as described below.

Figure 2:
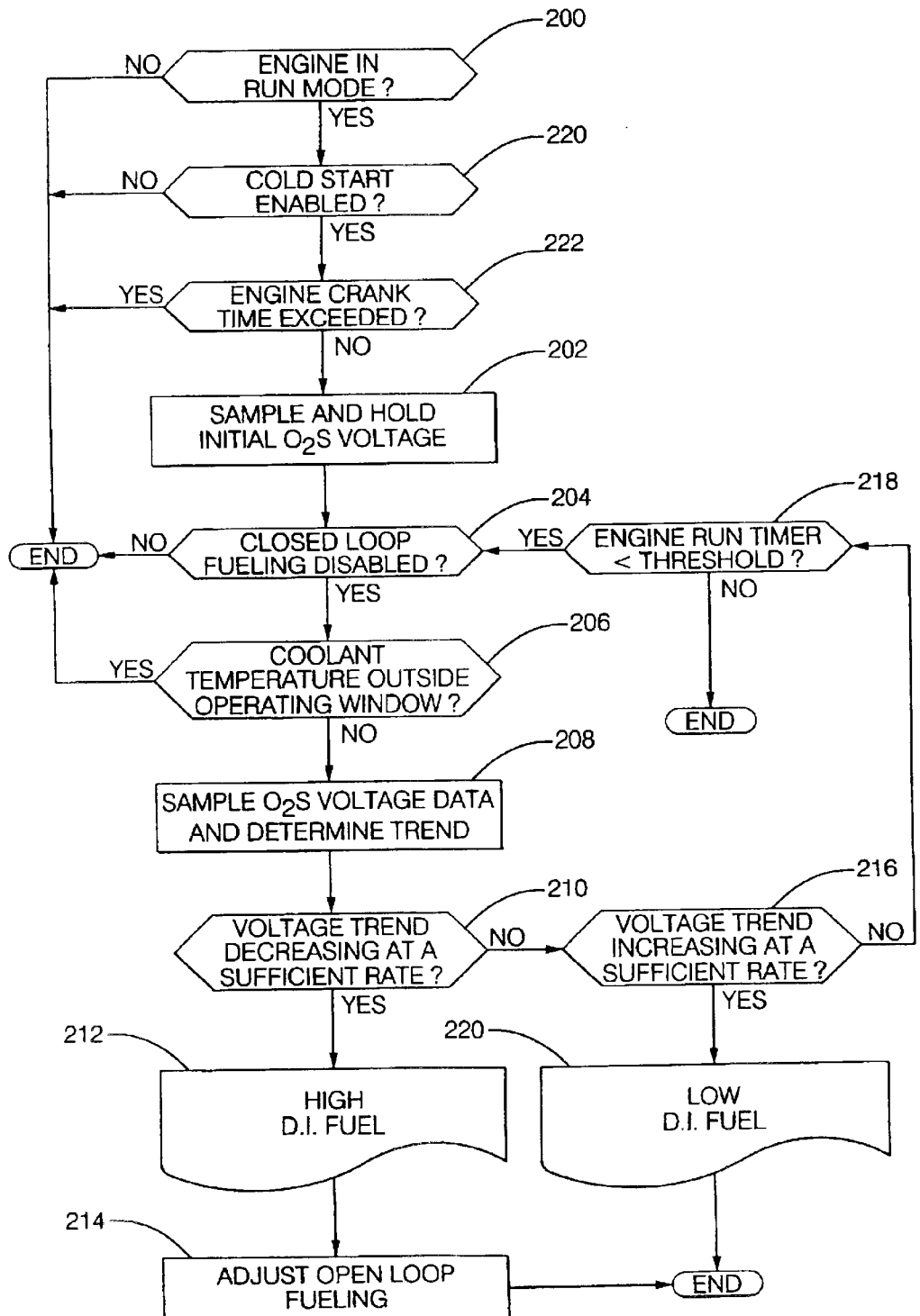
FIG. 2 illustrates an exemplary method for fuel driveability index detection.

Referring to FIG. 2, operation of the system will now be described. Note that in one embodiment, system logic may be executed at the beginning of each ignition key cycle, and any pumped air reference function of the oxygen sensor may be disabled. First, step 200 determines an engine run condition (e.g., whether the engine is running). For example, an engine control software engine RUN flag may be indicated. If the engine is not running, the process ends. If step 200 determines that the engine is running, then optional step 220 determines whether cold start is enabled. For example, step 220 determines whether the engine coolant temperature is at about the same temperature as the intake manifold air temperature. If not, the process ends because it is not a "cold start." Otherwise, optional step 222 determines whether the engine crank time has been exceeded. For example, an acceptable engine crank time at 20° C. may be less than 0.5 seconds, whereas an acceptable crank time at 0° C. may be less than 2 seconds. The acceptable crank time calibration thresholds may be determined through testing of a representative vehicle. If the answer to step 222 is yes, then the process ends. Otherwise, in step 202, the initial oxygen sensor voltage is sampled, and may be saved for a period (e.g., held in a buffer) to establish an initial oxygen sensor voltage value from which to base the future voltage trend. Next, step 204 may determine whether closed loop fuel control is disabled. For example, an engine control software closed loop enabled flag may be indicated if the system has gone into closed loop fuel control. If closed loop fueling is enabled, the process ends. Otherwise, step 206 may determine whether the engine coolant temperature is above or below an operating temperature by monitoring the coolant temperature sensor output. For example, step 206 determines whether the engine coolant has attained a sufficient temperature to allow rapid and complete fuel volatilization (e.g., if the engine coolant is above about 25° C., or preferably above about 30° C., rapid and complete fuel volatilization will typically occur regardless of fuel driveability index number). Note that volatilization temperature may vary from engine to engine, and one skilled in the art can readily determine a sufficient engine coolant temperature through routine experimentation and/or analysis. Thus, in step 206, if the engine coolant temperature is outside its temperature operating window, the process ends.

Otherwise, in step 208, the oxygen sensor voltage is sampled, preferably for a calibratable amount of time, and compared to the initial voltage value from step 202 to determine a voltage trend with time. For example, trend determination may be made by comparing the voltages recorded in steps 202 and 208 to one another, and dividing the value by the amount of time the engine has been in the RUN mode (e.g., as indicated by an engine run timer). The change in voltage (volts) divided by time (seconds) gives the rate of the voltage trend. However, any method of determining voltage trend using sequential sampling techniques may be employed. Next, step 210 determines whether the voltage trend is decreasing at a sufficient rate to warrant adjustment of the fuel input to the engine. For example, step 210 determines whether the rate is insufficient to obtain a lean reading from the oxygen sensor 10 while taking possible "noise" into account. An exemplary sufficient first voltage threshold rate may be greater than about 0.02 volts per second (v/s). One skilled in the art can readily determine a sufficient rate through routine experimentation and/or analysis using a representative engine and fuels of known driveability index. If the answer to step 210 is yes, in step 212, an engine control software flag may be set for HIGH D.I. fuel, allowing the open loop fueling to the engine to be adjusted in step 214. The fuel control adjustment may be made by increasing the base pulse width command to the fuel injectors 18, thus increasing the amount of fuel added to the combustion chambers, wherein the process ends. An increase in fueling of one to two air/fuel ratios may be sufficient to stabilize combustion during a cold start using high driveability index fuel. However, one skilled in the art can readily determine the amount of fuel to be added through routine experimentation and/or analysis. Note, that if the answer to step 210 is yes, the fuel has a high driveability index (and a fuel driveability index status bit may be set to TRUE).

If the answer to step 210 is no, then step 216 determines whether the voltage trend is increasing at a sufficient rate to warrant no increase in the amount of fuel to the combustion chamber. For example, step 216 determines whether the rate is insufficient to obtain a rich reading from the oxygen sensor 10 while taking possible "noise" into account. An exemplary sufficient second voltage threshold rate may be greater than about 0.02 volts per second (v/s). One skilled in the art can readily determine a sufficient rate through routine experimentation and/or analysis using a representative engine and fuels of known driveability index. If the answer to step 216 is yes, it may be determined that the fuel has a low driveability index (and a fuel driveability index status bit may be set to False), and the process ends with no fueling changes (or, optionally, a decrease in the amount of fuel introduced to the combustion chambers may be made for fuel economy, as may be determined by one skilled in the art through routine experimentation and/or analysis). If the answer to step 216 is no, then step 218 determines whether the engine run timer is less than a run timer calibratable threshold. Again, the engine run timer calibratable threshold may be empirically obtained by one skilled in the art through routine experimentation and/or analysis. Typically, the engine run timer threshold is less than or equal to about 6 seconds, with less than or equal to about 5 seconds preferred. If the engine run timer is not less than the run timer calibratable threshold, the process ends. Otherwise, step 204 is repeated.

Figure 3:
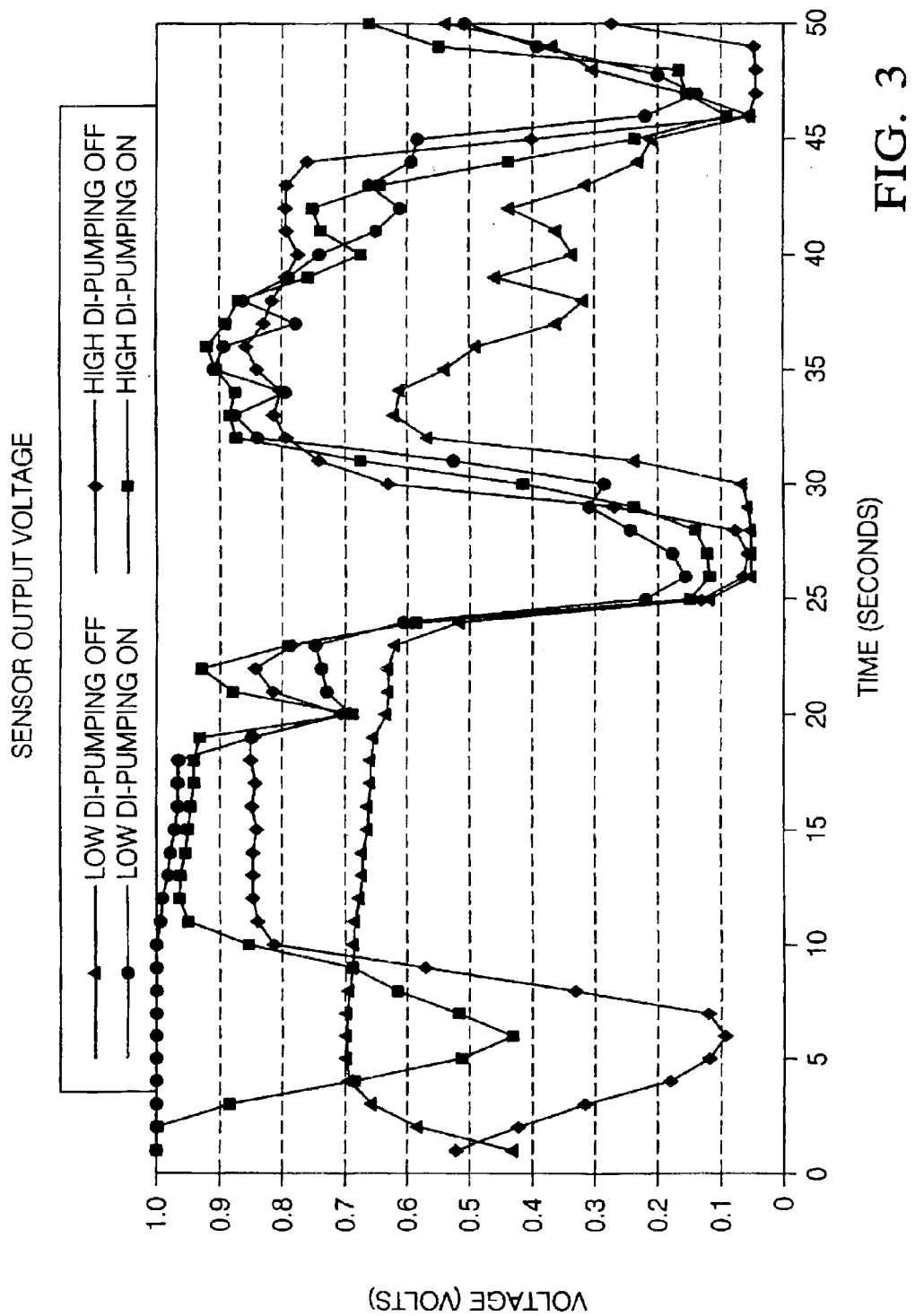
FIG. 3 depicts a graph of exemplary output voltage for four fast light-off, stoichiometric oxygen sensors.

FIG. 3 is a graph of exemplary output voltages for four fast light-off, stoichiometric oxygen sensors from four individual cold start FTP emissions tests. Two levels of fuel driveability index are represented (California Phase 2 fuel with a driveability index of 1138 and commercially available low Reed Vapor Pressure test fuel with a driveability index of 1298), and with the oxygen sensor air reference pumping current on and off. Note that the plots using low driveability index fuel show an increasing or steady state voltage trend during the first five seconds of the test. This is to be expected, as the air/fuel ratio is typically rich of stoichiometry during a cold start, (assuming no additional air is injected into the exhaust stream).

Conversely, the plots generated using the high driveability index fuel show a decreasing voltage, indicative of a lean air/fuel ratio, during the first five seconds of the test. This lean air/fuel ratio is due to the inability of the high driveability index fuel to volatilize in the combustion chamber until the engine is sufficiently warm to increase the evaporation rate. This increased evaporation rate may become equivalent for both fuels by about the ten second point, at which time the sensor may no longer be able to distinguish between the two driveability index levels. Thus, by applying the method of FIG. 2 to the data shown in FIG. 3, the difference in the driveability index of the fuels used for the test may be determined, and corrections made to the open loop fueling during the first five seconds after the cold start.

The techniques described herein have an advantage over techniques requiring an exhaust gas temperature measurement to determine driveability index, because the need for an exhaust gas temperature sensor is eliminated, and a more direct measurement of the effects of fuel volitility can be made. As previously mentioned, the techniques described herein help to prevent engine stall at cold start, and allow for a smoother cold start by calibrating the system based on the quality of the fuel. The techniques eliminate the need to calibrate for a worst-case fuel to prevent engine stall. Note that techniques calibrating for worst-case fuel (e.g., high driveability index fuel) can also cause higher emissions during cold start when a "better than worst-case" fuel is used (e.g., low driveability index fuel) because too great a quantity of fuel is introduced to the combustion chambers. Thus, the techniques described herein allow for more consistent combustion and emission, and may also improve fuel economy. The system of FIG. 1, including the embodiments described herein may be included in a vehicle such as an automobile, truck, bus, motorcycle, stationary engine as used for power generation, or the like.

The description applying the above embodiments is merely illustrative. As described above, embodiments in the form of processor-implemented processes and apparatuses for practicing those processes may be included. Also included may be embodiments in the form of computer program code containing instructions embodied in tangible media wherein, when the computer program code is loaded into and executed by a processor, the processor becomes an apparatus for practicing the invention. When implemented on a general-purpose processor, the computer program code segments configure the processor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for fuel driveability index detection, the method comprising:
    measuring an exhaust gas feedstream of an internal combustion engine with an oxygen sensor;
    sensing an engine run condition;
    obtaining a first input signal indicating a first oxygen sensor voltage;
    obtaining a second input signal indicating a second oxygen sensor voltage at a period subsequent to said first input signal;
    determining a first voltage trend based on said first input signal and said second input signal; and
    determining whether said first voltage trend is decreasing at a rate greater than a first voltage threshold rate; and,
    adjusting open loop fueling if said first voltage trend is decreasing at a rate greater than said first voltage threshold rate by adding fuel to combustion chambers of the internal combustion engine;
    wherein said adjusting open loop fueling occurs within about five seconds of a cold start of the internal combustion engine.

2. The method of claim 1, wherein said adding fuel is accomplished by increasing a base pulse width command to fuel injectors of said engine.

3. The method of claim 1, wherein said sensing said engine run condition includes determining whether a software logic flag indicating an engine run condition has been set.

4. The method of claim 1, further including determining whether closed loop fueling is disabled prior to obtaining said second input signal.

5. The method of claim 1, further including determining whether engine coolant temperature is within a temperature operating window prior to obtaining said second input signal.

6. A system for fuel driveability index detection, the system comprising:

an engine;

an oxygen sensor disposed within the exhaust gas passage of said engine; and an engine control module operatively connected to said engine having a processor for:
obtaining a first input signal indicating a first oxygen sensor voltage, obtaining a second input signal indicating a second oxygen sensor voltage at a period subsequent to said first input signal, determining a first voltage trend based on said first input signal and said second input signal, determining whether said first voltage trend is decreasing at a rate greater than a first voltage threshold rate, determining whether said first voltage trend is increasing at a rate greater than a second voltage threshold rate if said first voltage trend is not decreasing at a rate greater than said first voltage threshold rate, determining whether an engine run timer is less than an engine run timer threshold if said first voltage trend is not increasing at a rate greater than said second voltage threshold rate, obtaining a next input signal indicating a next oxygen sensor voltage if said engine run timer is less than said engine run timer threshold, determining a second voltage trend based on said first input signal and said next input signal, determining whether said second voltage trend is decreasing at a rate greater than said first voltage threshold rate, setting a software logic flag indicating a low driveability index if said first voltage trend is increasing at a rate greater than said second voltage threshold rate, and setting a software logic flag indicating a high driveability index if said second voltage trend is decreasing at a rate greater than said first voltage threshold rate.

7. The system of claim 6, further including said processor adjusting open loop fueling if said second voltage trend is decreasing at a rate greater than said first voltage threshold rate.

* * * * *